UNITED STATES PATENT OFFICE.

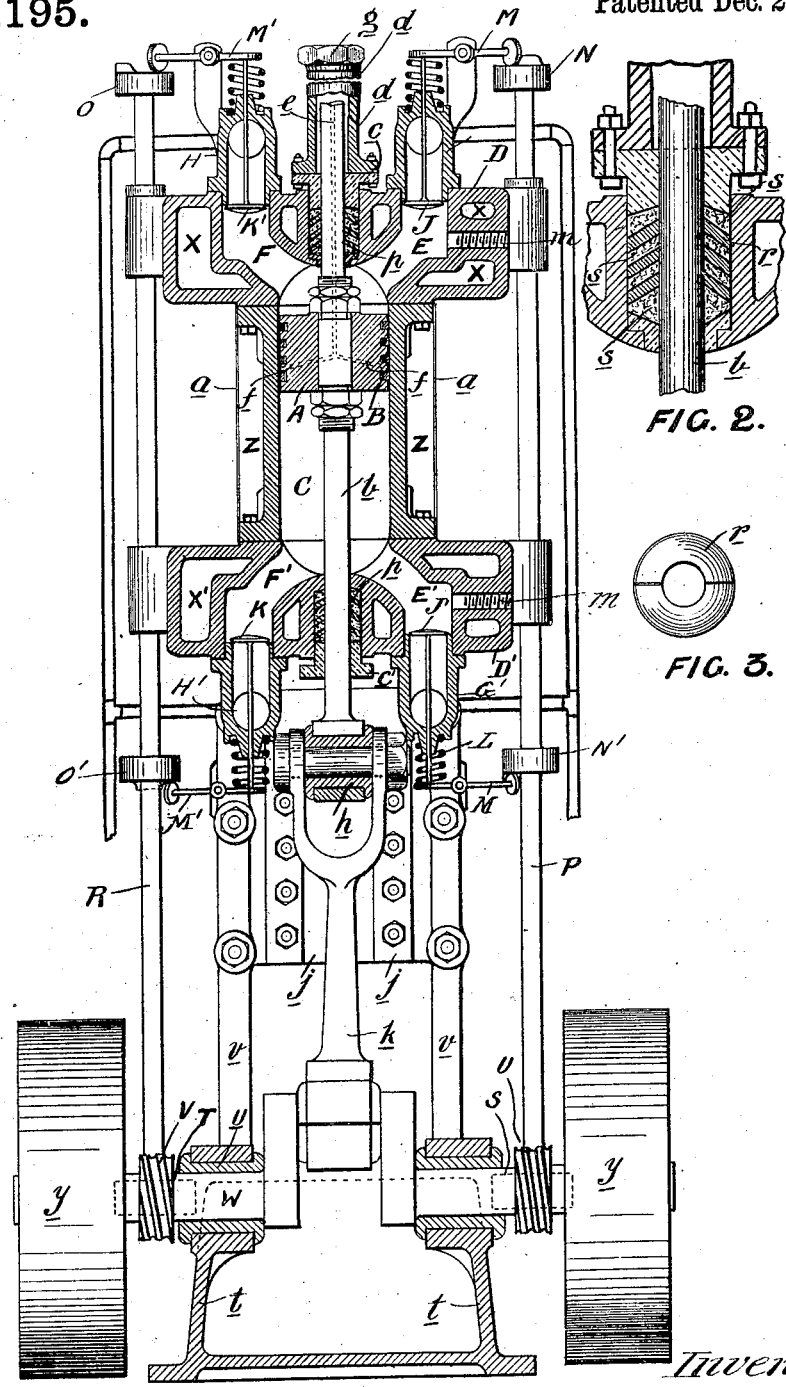

HUGH VALDEMAR JOHANSEN, OF DEVONPORT, NEAR AUCKLAND, NEW ZEALAND.

DOUBLE-IMPULSE INTERNAL-EXPLOSIVE ENGINE.

944,195. Specification of Letters Patent. Patented Dec. 21, 1909.

Application filed December 2, 1907. Serial No. 404,818.

*To all whom it may concern:*

Be it known that I, HUGH VALDEMAR JOHANSEN, a subject of His Majesty the King of the United Kingdom of Great Britain and Ireland, resident of Devonport, near the city of Auckland, in the Provincial District of Auckland and Colony of New Zealand, engineer, have invented a new and useful Double-Impulse Internal-Explosive Engine, of which the following is a specification.

This invention relates to explosive engines and the means of operating the same by means of a double impulse cycle.
The invention relates more particularly to that type of engines in which an explosion of gas, oil vapor or the like occurs regularly on both sides of the piston of an internal explosion engine, thereby giving an impulse to the piston on the upward or back stroke as well as on the downward or outward stroke, the crank thus receiving an impulse every complete revolution instead of every other revolution as is the case with the ordinary type of oil or gas engine in use at present.

In the accompanying drawings three figures are shown of which:—

Figure 1 is a sectional elevation of the engine showing its various parts, Fig. 2 is a section through the gland and stuffing box of the engine showing method of packing the gland, and Fig. 3 is a plan of one of the split rings used in packing the glands.
The piston A which is fitted with ordinary piston rings B, works within the cylinder C. Cylinder heads D D' are bolted in a well known manner to the top and bottom flanges of the cylinder C and communicate with the cylinder by means of the inlet passages E, E' and the exhaust passages F, F'. To the cylinder heads D and D' are bolted in a well known manner the inlet valve boxes G and G' communicating with the inlet passages E and E' and the exhaust valve boxes H and H' communicating with the exhaust passages F and F'. These valve boxes G and G' and H and H' extend in the direction of the axis of the cylinder and are fitted with valves J and J' and K and K' which move axially of the said boxes and are held on their seats by means of the springs L and L'. The valves J, J' and K, K' are operated by means of the pivoted two-armed levers M, M' which in turn are operated by the revolving cams N, N' and O, O' mounted on the cam shafts P and R which are journaled in bearings secured at the sides of the cylinder heads and extend parallel to the cylinder. To the bottom end of the cam shafts P and R screw gears S and T are fixed, these screw gears S and T engage with screw gears U and V mounted on the crank shaft W. The screw gears S and T are so proportioned to the screw gears U and V that it takes two revolutions of the latter in order to turn the former through one complete revolution thus each of the valves J, J' and K, K' will only be operated or opened once for every two complete revolutions of the crank shaft W.

Suitable water cooling passages or jackets X X' are formed in the cylinder heads D and D' and a similar jacket Z is formed around the cylinder C by surrounding the cylinder C with a second cylinder or sleeve *a* of thin metal, preferably brass or copper, the cylinder *a* being suitably secured to the flanges of the cylinder C.

The piston A carries a piston rod *b* secured by nuts or other suitable means, this piston rod *b* works through the glands *c c'* in the cylinder heads D and D' and at its top or outward end extends some distance through the gland *c* into a circular oil chamber *d*. A hole *e* is formed through the center or core of the piston rod, extending downward till it reaches to about the middle of the piston A, when it meets two diagonal holes *f* formed in the piston A. These holes *f* extend to the outside circumference of the piston A. The oil chamber *d* being filled with oil by means of unscrewing the cap *g* at the top thereof when the piston rod *b* is on its upstroke some of the oil contained in the oil chamber *d* is forced through the hole *e* along the hole *f* to within the cylinder C, thereby efficiently lubricating the walls of the cylinder. The oil chamber *d* is secured by means of the usual studs which secure the gland *c*. A convenient form of cross head *h* is formed on the bottom end of piston rod *b*, this cross head *h* works in guides *j*; the arm of the crank shaft W is connected to the cross-head *h* by means of connecting rod *k*.

Any suitable form of ignition may be used, but preferably electric, in which case the sparking plugs are screwed into the holes *m m*.

The cylinder C may if preferred have a cylinder jacket cast on instead of the loose jacket *a*. The piston rod *b* is made to work tight in the cylinder heads D and D' by means of the stuffing boxes $p$ which are fitted with a series of split metal rings $r$ shaped conically as shown in Figs. 2 and 3; between the metal rings $r$ and at the top of the first metal ring $r$ and at the bottom of the last or bottom metal ring $r$ is placed a mass $s$ of thin shavings or ribbons of white metal. On tightening the gland $c$ by means of the ordinary gland studs and nuts, each ring $r$ by reason of its conical or wedge shape forces each mass $s$ of white metal ribbon against the piston rod $b$, thereby compensating for wear in the packing, and preserving a tight working piston rod.

The engine is mounted on a bed plate $t$ which carries the crank shaft bearings $u$ and the columns $v$ for supporting the cylinder and guides. Suitable fly wheels or pulley wheels $y$ are fitted to crank shaft W.

The inlet valve boxes G and G' are connected by means of a common pipe to the oil vapor or gas or explosive mixture supply and the exhaust valve boxes H and H' are in like manner connected by a common exhaust pipe.

The cam N is so set on the cam shaft P as to operate the valve J once for every two revolutions of the crank when the piston is on its down stroke, the valve J' being likewise operated once for every two revolutions of the crank when the piston A is on its upstroke and each valve K and K' is in like manner operated once for every two revolutions of the crank shaft W, the valve K when the piston A is on its upstroke and the valve K' when the piston A is on its downstroke.

It will be seen that the piston A on its down stroke draws in a charge of gas or oil vapor or mixture through the valve J, the valve K' being also open. On the upstroke of the piston the gas in the top end of the cylinder is compressed and the inlet valve J' being opened a charge of gas is drawn in the bottom end of the cylinder C; when the piston has reached the top of this stroke the compressed charge in the top end of the cylinder is exploded by means of an electric spark, or like means thus propelling the piston downward and compressing the charge in the bottom end of the cylinder which in turn is exploded propelling the piston upward the valve K being open on this stroke allowing the exhaust gases contained in the upper end of cylinder to escape, and this cycle is then repeated continuously while the engine is running.

Having fully described my invention what I desire to claim and secure by Letters Patent is:—

In an explosive engine of the type set forth, in combination, an engine cylinder, heads secured at the ends thereof and each provided with a pair of oppositely located ports, communicating with the cylinder, valve boxes fitted to the heads, in alinement with the ports, and extending in the direction of the axis of the cylinder, valves disposed in the boxes, movable axially thereof and having projecting stems, springs to maintain the valves normally closed, a two-armed lever pivoted adjacent each valve and having an end engaging the valve stem and a laterally projecting end, bearings provided at opposite sides of the cylinder heads, longitudinal shafts journaled in the bearings and extending parallel to the cylinder, cams provided on the shafts for engagement with the projecting ends of the adjacent levers, a transverse crank shaft and gearing between the crank shaft and each of the first-named shafts.

HUGH VALDEMAR JOHANSEN.

Witnesses:
  GEORGE WILLIAM BASLEY,
  HILDA MAY FROUDE.